March 26, 1968   T. J. LEVEQUE   3,374,803
VOLUME AND FLOW CONTROL DEVICE
Filed June 17, 1965
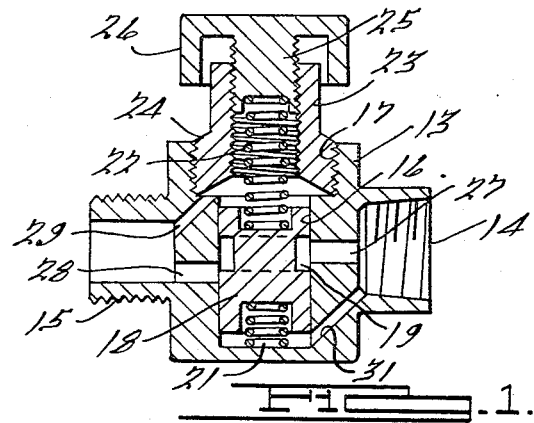
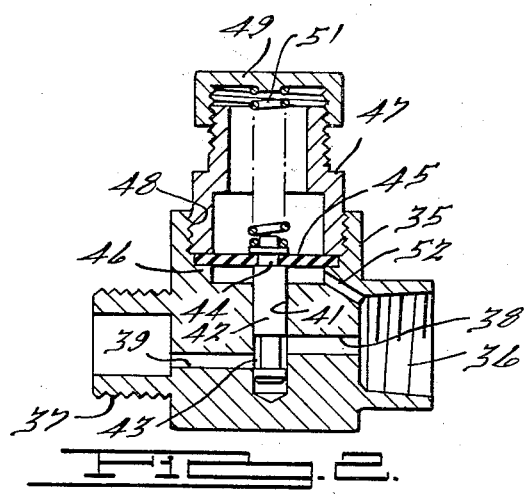
INVENTOR.
Treffle J. Leveque
BY
Harness, Dickey & Pierce
ATTORNEYS.

United States Patent Office 3,374,803
Patented Mar. 26, 1968

3,374,803
VOLUME AND FLOW CONTROL DEVICE
Treffle J. Leveque, 16606 Glastonbury,
Detroit, Mich. 48219
Filed June 17, 1965, Ser. No. 464,643
4 Claims. (Cl. 137—503)

ABSTRACT OF THE DISCLOSURE

The valve of the present invention maintains a set pressure for operating a device to which it is applied irrespective of higher pressures at different supply sources. The body of the valve is a screw machine part having aligned threaded, recessed bosses. The recesses communicate with the valve body through passageways therefrom that are offset relative to each other. This prevents the valve body from binding and assures accurate control of the air pressure.

---

This invention relates to pressure and volume air control valves, and particularly to a valve which varies the volume and delivery of air and controls the speed of operation of a motor or a like device.

Air operated tools are usually designed to function efficiently on a specific pressure recommended by the manufacturer. While facilities may be provided for maintaining a constant pressure in its supply lines, usually in small operations such facilities are lacking and the manually adjustable volume and pressure control governors which could be employed are costly and cumbersome.

It is the object of the present invention to provide a simple and inexpensive valve for controlling the volume and the flow of air to a motor when connected directly thereto.

A further object of the invention is to employ the back pressure of the air from the motor for controlling the flow of air thereto.

It is a still further object of the invention to employ a spring pressed piston within a valve body on which the pressure of the air is exerted to compensate the tension of the spring to and thereby vary the flow of air through the valve.

Another object of the invention is to provide a volume control valve which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

FIGURE 1 is a sectional view of a volume and pressure control valve embodying features of the present invention, and FIG. 2 is a sectional view of a volume control valve, similar to that illustrated in FIG. 1, showing a further form of the invention.

Referring to FIG. 1 a control valve is illustrated comprising a body 13 having an interiorly threaded intake end 14, and an exteriorly threaded outlet end 15. Transversely of the axis of the threaded intake and outlet ends 14 and 15 is a cylindrical aperture 16 which has a closed bottom and a threaded opening 17 at the top. Within the cylindrical aperture 16 a piston 18 is located, the outer cylindrical surface of which has an annular slot 19 forming a passage thereabout. A spring 21 urges the piston 19 upwardly in the aperture 16 against a spring 22 of greater strength which extends within a sleeve 23 which has a flanged threaded end 24 secured in the threaded aperture 17. The upper end of the sleeve 23 has an adjusting stud 25 extending downwardly therein in engagement with the upper end of the spring 22 the tension of which is adjusted by rotating a head 26 on the upper end of the stud.

The inlet end 14 communicates with the aperture 16 through a cylindrical passageway 27 and a similar passageway 25 is provided between the aperture 16 and the outlet end 15 of the body. It will be noted that the passageways 27 and 28 are offset from each other for the purpose of preventing the pressure of the entering air at the inlet end 14 from forcing the piston 18 toward the opposite side of the cylindrical aperture 16 and produce friction which would hamper the operation of the piston. The spring 21 provides pressure on the bottom of the piston to prevent it from bottoming in the aperture 16.

A cylindrical aperture 29 connects the passageway in the outlet end 15 with the top of the aperture 16 above the piston 18. The threaded aperture 17 is employed when a screw machine part is used for the body rather than a casting, forging and the like in which case the sleeve is formed as an integral part of the body 13. A passageway 31 may be provided in the body extending from the intake end 14 to the bottom of the aperture 16. This may be employed with or without the spring 21 and in some instances is eliminated when only the spring 21 is used to counterbalance the tension of the spring 22.

The outlet end 15 of the valve body 13 is directly connected to the intake port of the motor or other device, and the head 26 is adjusted to position the piston 18 so as to have a proper amount of fluid delivered to operate the motor or other device at a desired idling speed. If, for example, the valve is attached to the motor of a sander, the motor will be driven at idling speed until the sanding disc is applied to the work. When this occurs, pressure will build up within the motor, the passageway 29 and upon the top of the piston 18. This will add to the pressure of the spring 22 and force the piston 18 downwardly to thereby further align the recess 19 with the passageways 27 and 28 and thereby deliver a greater amount of air to the motor. This balancing of the piston will occur so long as the motor requires an additional amount of air to perform the sanding operation. When the sanding disc is removed from the work, the back pressure is removed from the passageway 29 and top of the piston 18 permitting the piston to be retracted by the spring 21 or by the pressure of the air in the passageway 31 at the bottom of the piston or both, as the case may be. This shifts the piston 18 upwardly and thereby offsets the annular recess 19 from the passageways 27 and 28 to again supply the amount of air required for the idling operation of the motor. When the sanding disc is again applied to the work, the piston will be shifted downwardly to again supply the needed increase in the amount of air required to drive the motor when subjected to the increased load. With this arrangement the valve functions as a governor to prevent the runaway operation of the motor when the sanding disc is unloaded.

A similar valve is illustrated in FIG. 2 which operates in a similar manner to control the volume of air being delivered through the valve. The valve has a body 35 containing an inlet end 36 and an outlet end 37 communicating through passageways 38 and 39 with a transverse aperture 41 in the center of the body. A piston 42 is slidably disposed within the aperture 41 and is provided with an annular recess 43 near the bottom end. The upper end of the piston has a recess 44 which receives a diaphragm 45 of elastomeric material which is clamped against a shoulder 46 by a threaded sleeve 47. The sleeve extends within a threaded aperture 48 concentric with the aperture 41 located at the top of the body 35. A cap 49 is threaded on the upper end of the sleeve for engaging a spring 51, the opposite end of which engages the top of the piston 42. The cap 49 adjusts the tension on the spring 51 for positioning the annular recess 43 relative to the offset apertures 38 and 39. A passageway 52 connects the intake end 36 with the area beneath the diaphragm 45 so that the pressure of the air supply will operate against the tension of spring 51 to position the annular recess 43 relative to the passageway 39. When a light pressure is present, the annular recess uncovers the aperture 39 so that a full flow of air will pass through the valve. If a less amount of air is required at this pressure, the cap 49 is adjusted to permit the piston 42 to be moved upwardly to cut off a portion of the passageway 39. Should the pressure in the supply line increase, the diaphragm 45 will be moved upwardly by the pressure of air therebelow admitted through the passageway 52 to further raise the piston 42 and thereby cut off a greater amount of air to the passageway 39. In this manner the valve controls the amount of air which is delivered to the motor under a desired pressure.

In either of the valves of FIG. 1 and FIG. 2, manual adjustment is provided directly adjacent to the air operated devices such as air motors, rams, spray nozzles and the like. The demand by the air operated devices is satisfied by the valve irrespective of the supply pressure, by the manual adjustment of the valve which changes the tension of the spring on the valve piston.

I claim:

1. A valve having a body which has opposite ends machined to have aligned bosses each containing a thread and a large recess, said body having an aperture extending inwardly from one side between said recesses and normal thereto, said body having apertures communicating said recesses with said first aperture, said second apertures being in offcenter relation to each other within the area of the aligned recesses, a piston in the first said body aperture having an annular recess for controlling the flow of fluid between said second apertures by reducing the area of one of said second apertures, and a spring at each of said piston.

2. In a valve as recited in claim 1 wherein the recess of one boss communicates with the bottom of the piston.

3. In a valve as recited in claim 2 wherein the recess of the other boss communicates with the top of the piston.

4. In a valve as recited in claim 2 wherein means are provided for adjusting the tension on one of said springs.

References Cited

UNITED STATES PATENTS

| 2,226,611 | 12/1940 | McCollum | 137—505.12 X |
| 2,440,961 | 5/1948 | Link | 137—503 X |
| 2,703,631 | 3/1955 | Hupp | 137—503 X |
| 2,881,793 | 4/1959 | Lee | 137—501 |

FOREIGN PATENTS 780,198 7/1957 Great Britain.

M. CARY NELSON, *Primary Examiner.*

ROBERT J. MILLER, *Assistant Examiner.*

UNITED STATES PATENT OFFICE
CERTIFICATE OF CORRECTION

Patent No. 3,374,803  March 26, 1968

Treffle J. Leveque

It is certified that error appears in the above identified patent and that said Letters Patent are hereby corrected as shown below:

Column 4, line 8, after "each" insert -- end --.

Signed and sealed this 5th day of August 1969.

(SEAL)
Attest:

Edward M. Fletcher, Jr.  WILLIAM E. SCHUYLER, JR.
Attesting Officer  Commissioner of Patents